United States Patent [19]

Kuffer

[11] Patent Number: 5,327,149
[45] Date of Patent: Jul. 5, 1994

[54] R.F. TRANSPARENT RF/UV-IR DETECTOR APPARATUS

[75] Inventor: Fernand B. Kuffer, Brea, Calif.

[73] Assignee: Hughes Missile Systems Company, Los Angeles, Calif.

[21] Appl. No.: 885,105

[22] Filed: May 18, 1992

[51] Int. Cl.5 ............... H01Q 21/280; H01Q 19/190; H01Q 15/140; G01S 13/00
[52] U.S. Cl. .................................. 343/720; 343/725; 343/781 CA; 342/53
[58] Field of Search .............. 342/53; 343/720, 725, 343/781 CA, 909; 359/360; H01Q 19/18, 19/19, 19/20, 21/28, 21/29, 21/30

[56] References Cited

U.S. PATENT DOCUMENTS

| | | | |
|---|---|---|---|
| 4,035,065 | 7/1977 | Fletcher et al. | 359/848 |
| 4,477,814 | 10/1984 | Brumbaugh et al. | 343/770 |
| 4,698,638 | 10/1987 | Branigan et al. | 343/725 |
| 4,814,785 | 3/1989 | Wu | 343/909 |
| 4,866,454 | 9/1989 | Droessler et al. | 343/781 CA |
| 5,019,768 | 5/1991 | Criswell et al. | 244/159 |
| 5,182,564 | 1/1993 | Burkett et al. | 343/720 |

FOREIGN PATENT DOCUMENTS

| | | | |
|---|---|---|---|
| 8929399 | 8/1990 | Australia | 359/360 |
| 0048608 | 8/1986 | Japan | 343/781 CA |

OTHER PUBLICATIONS

Translation of Japan Kokai Publication #61-0178683 (Aug. 1986) to Kitajima, 6 pages.

Primary Examiner—Rolf Hille
Assistant Examiner—Peter Toby Brown
Attorney, Agent, or Firm—Charles D. Brown; Randall M. Heald; Wanda K. Denson-Low

[57] ABSTRACT

A dual-mode, radio frequency, optical-wavelength detector apparatus includes RF-transparent optical elements adapted to focusing optical energy in a wavelength range including ultraviolet through infrared wavelengths, on an optical detector, and an RF antenna located behind the optical elements. One embodiment of the apparatus employs a Cassegrain infrared optical telescope system having a concave primary mirror, the front surface of which has applied thereto multiple layers of dielectric material comprising an interference filter reflective in a band of infrared wavelengths, and transmissive to radio frequency energy. A convex secondary mirror having a similar reflective coating is so located as to reflect infrared energy backwards through a central coaxial perforation through the primary mirror onto an infrared detector. The apparatus includes a planar RF antenna rearward of the primary mirror, which antenna utilizes the full aperture of the infrared optical system for the reception and transmission of RF energy.

33 Claims, 8 Drawing Sheets

R.F. TRANSPARENT RF/UV-IR DETECTOR APPARATUS

BACKGROUND OF THE INVENTION

A. Field of the Invention

This invention relates to apparatus for collecting and focusing onto a detector optical radiation in the ultraviolet (UV) through infrared (IR) portion of the electromagnetic spectrum, and to apparatus for receiving and transmitting radio frequency (RF) energy. More particularly, the invention relates to a dual mode apparatus in which are combined the functions of an optical detection system, and a radio energy frequency detection system.

B. Description of Background Art

Radar and laser transceivers are widely used in both military and civilian applications to determine the position and velocity of distant objects, or "targets." Radar or laser acquisition and tracking systems are "active" systems, in the sense that they transmit energy from a radiating element or antenna, which is then reflected off of a target back towards the element or antenna. Some radio frequency acquisition and tracking systems are also passive, utilizing either intentionally transmitted energy, or the black-body radiation emitted by all objects at a temperature above absolute zero.

Passive optical radiation receivers are also widely used to form images of distant objects, utilizing the radiation reflected from or emitted by objects. Such systems typically operate in a wavelength range extending from about 0.35 micron (micrometers), in the ultraviolet portion of the spectrum, through the visible spectrum, and out to about 14 microns, in the infrared portion of the spectrum.

In some applications, it is desirable to be able to acquire and/or track distant objects, or targets, alternatively in the radio-frequency or UV-IR portion of the electromagnetic spectrum. Passive UV or IR tracking systems do not require transmission power, and may operate at longer ranges than radar trackers. However, when a target is obscured by clouds, fog, smoke dust or the like, such tracking systems may be inoperative, thus necessitating the use of an active or passive radio frequency tracker.

Both RF and UV-IR trackers generally must work with very low energy signals emitted by or reflected from a distant target. Therefore, receiving antennas or optical systems used to collect such signals should have the largest feasible collection area, or aperture. Increasing the aperture size is also very desirable because it results in a narrower transmitted beam, and reduces the susceptibility of the receiver to interference from off-axis, non-target emitters such as jammers, or reflective objects other than the target. Accordingly, dual mode RF/IR or UV tracking systems require a considerable amount of space for the required collection optics. That space requirement can be particularly troublesome when the dual mode system is to be used in an aircraft or missile. To alleviate the space requirement problem, devices in which energy collectors for radio frequency and infrared radiation are at least partially combined are disclosed in the following U.S. patents:

Cushner, U.S. Pat. No. 3,165,749, Jan. 12, 1965, Microwave Transmissive Optical Radiation Reflectors, which discloses a Cassegrain infrared sensor system employing a microwave transceiver antenna horn at the position of the secondary mirror. The horn opening is covered with a microwave transmissive, optically reflecting "dichroic" mirror fabricated by forming a hexagonal or linear array of optically reflecting metallic mirror segments on a glass, quartz, or other microwave-transmissive substrate, microwave energy being transmittable through gaps between segments.

Winderman, et al., U.S. Pat. No. 4,282,527, Aug. 4, 1981, Multi-Spectral Detection System with Common Collecting Means, which discloses a multi-spectral detection system for detecting radiation within frequency bands that are in diverse portions of the electromagnetic spectrum. The preferred embodiment is a Cassegrain system including a primary reflector for reflecting radiant energy in the radio frequency and infrared portions of the electro-magnetic spectrum; a subreflector positioned along the axis of the primary reflector for re-reflecting the radiant energy reflected from the primary reflector toward the primary reflector and focusing the re-reflected radiant energy in a common focal plane about the system axis; a feed horn coaxially positioned at the common focal plane and having an entrance in the common focal plane about the system axis for transferring the collected radio frequency radiant energy from the focal plane to a detector of radio frequency radiant energy; and a bundle of optical fibers coaxially positioned at the common focal plane and having openings in the common focal plane about the system axis for transferring collected infrared radiant energy from the focal plane to a detector of infrared radiant energy. A baffle is coaxially positioned for blocking light other than the re-reflected infrared radiation from being received and transferred by the optical fibers.

Brumbaugh, et al., U.S. Pat. No. 4,477,814, Oct. 16, 1984, Dual Mode Radio Frequency-Infrared Frequency System, which discloses a dual mode RF-IR sensor system in which the primary mirror of a Cassegrain system has a central polished and aluminized region to reflect IR energy, and four slots to transmit RF energy. The secondary mirror is made of any suitable rigid RF-transmissive plastic, the reflective surface of the secondary mirror being covered with "any suitable IR-reflective/RF transmissive dielectric coating." A parabolic body forms both the primary mirror for a Cassegrain infrared sensor, and a radiating/receiving body for microwave energy, utilizing a common surface. Only a central portion of the parabolic body is polished, aluminized and used as an IR reflecting surface, and has integral slots forming part of a strip line antenna.

Droessler, U.S. Pat. No. 4,866,454, Sep. 12, 1989, Multi-Spectral Imaging System, which discloses an infrared sensor and millimeter wave (MMW) transceiver apparatus having a common collecting aperture and coaxial elements. The IR sensor includes a Cassegrain optical system in which incoming rays are reflected forward off the outer annular surface of a parabolic primary mirror, backward off of an IR-reflective, RF-transmissive thin film on the convex surface of a secondary reflector, and through an IR-transmissive, RF-reflective coating on the front concave surface of a circular core section fitted into a central aperture in the reflector, to a rear IR detector focal plane.

In the dual mode system, received MMW rays impinging on the outer annular surface of the primary reflector are reflected forward to impinge on the thin film coating on the secondary reflector and therethrough to a feedhorn. Received MMW rays closer to the optical axis of the apparatus pass through the secondary reflector, through the film and are reflected forward off the coating on the central core of the primary reflector, to impinge on the front coating of the secondary reflector and travel through the coating to the feed horn.

Simadao et al, in U.S. Pat. No. 3,763,493, Oct. 2, 1973, Antenna Device Applicable for Two Different Freauency Bands, which discloses an antenna apparatus adapted to simultaneous operation at two different radio frequencies.

Some of the dual mode seekers listed above may be useful for certain applications. However, all of the prior art dual mode seeker systems known to the present inventor have an inherent limitation, namely the fact that none of the systems utilizes the full aperture of a collecting system for either or both radio frequency and ultraviolet or infrared energy transmission and reception. The present invention was conceived of to overcome the above-mentioned limitation, and to provide other advantages over prior art dual mode seekers.

OBJECTS OF THE INVENTION

An object of the present invention is to provide an apparatus adapted for receiving and transmitting electromagnetic waves in both the radio frequency (RF) and "optical" (ultraviolet through infrared (IR)) wavelength bands of the electromagnetic spectrum.

Another object of the invention is to provide a dual mode, RF/UV-IR optical system in which substantially all of the aperture of the system is used for the transmission and reception of both radio frequency and optical energy, thus maximizing optical energy collection and RF antenna gain and directivity and minimizing side lobes, to a greater extent than systems using only part of the optical aperture for RF transmission.

Another object of the invention is to provide a full-aperture, dual-mode RF optical apparatus adapted for transmitting and receiving RF and IR energy, in which the RF and optical transmitting/receiving elements are coaxially arranged.

Another object of the invention is to provide a full-aperture, coaxial dual-mode RF optical coaxial system which uses rigid, RF-transparent optical elements which are very stable and capable of being and supporting high accuracy optical surfaces suitable for use in wavelengths ranging from ultraviolet to infrared.

Another object of the invention is to provide an RF/IR optical system which uses optical elements fabricated from light weight, low RF-loss RF transparent void-containing glass or ceramic materials.

Another object of the invention is to provide a dual mode RF/IR optical system in which all of the elements forward of an RF antenna are made of non-conductive dielectric materials, or other materials which allow transmission of RF energy with minimal attenuation.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends an apparatus for simultaneously collecting and focusing energy in the "optical" (ultraviolet through infrared) and microwave regions of the electromagnetic spectrum onto a detector and antenna respectively. The dual-mode optical/RF apparatus according to the present invention includes a Cassegrain optical telescope system having a primary mirror with a central perforation, and a secondary mirror adapted to focusing infrared images on an infrared detector located behind the perforation. All of the elements of the optical system are made of materials which are substantially transparent to radio frequency energy, thus permitting an RF antenna located behind the primary mirror to utilize the full aperture of the RF-transparent optical system for the transmission and reception of microwave energy. In the preferred embodiment, optically reflective, RF-transparent surfaces are formed on the front surface of the primary mirror and the rear surface of the secondary mirror by depositing multi-layer dielectric coatings forming interference filters on the surfaces.

DETAILED DESCRIPTION OF THE INVENTION

Figure 1A:
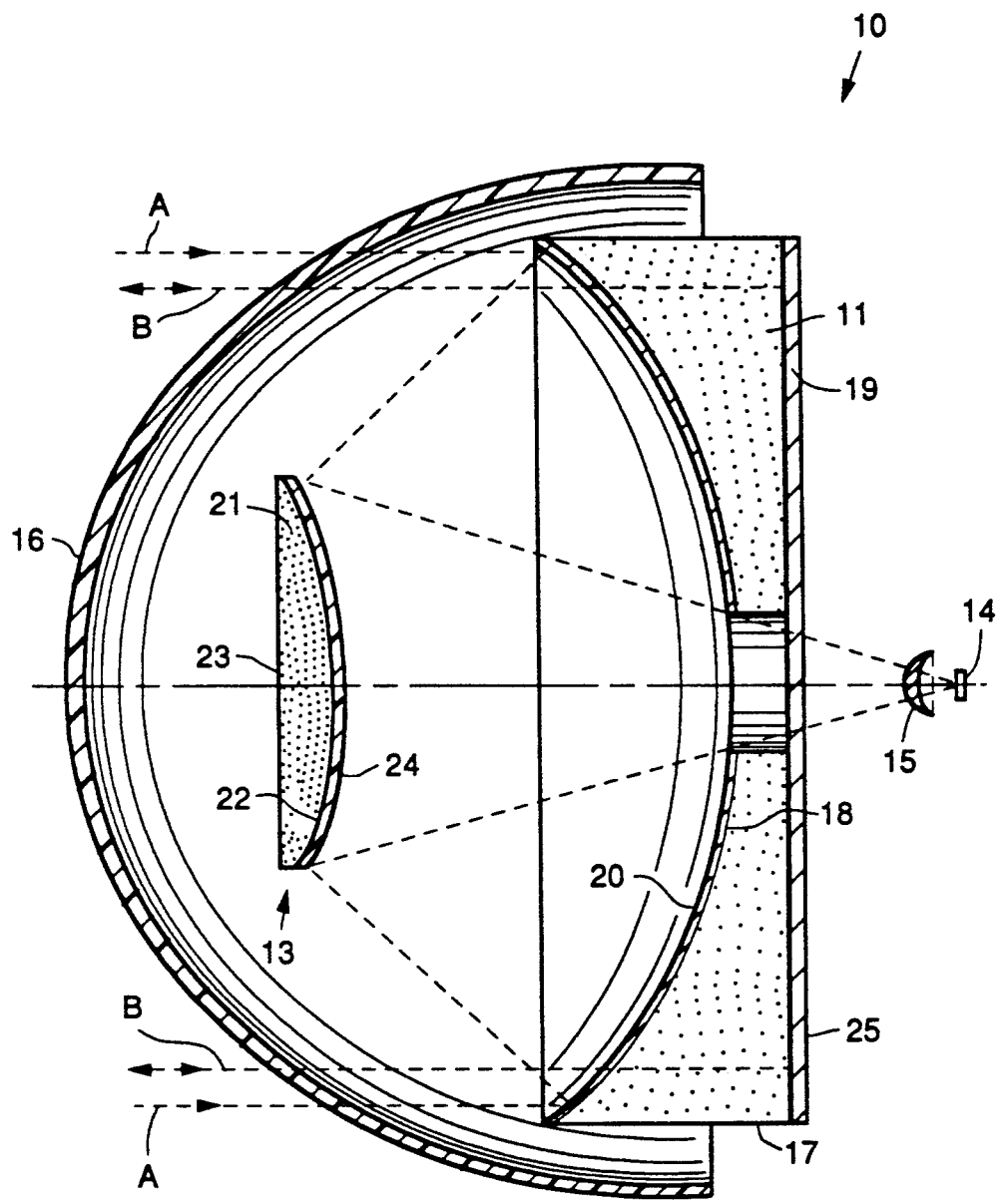
FIG. 1A is a longitudinal sectional view of one embodiment of an RF-transparent UV-IR optical apparatus according to the present invention.
Figure 1B:
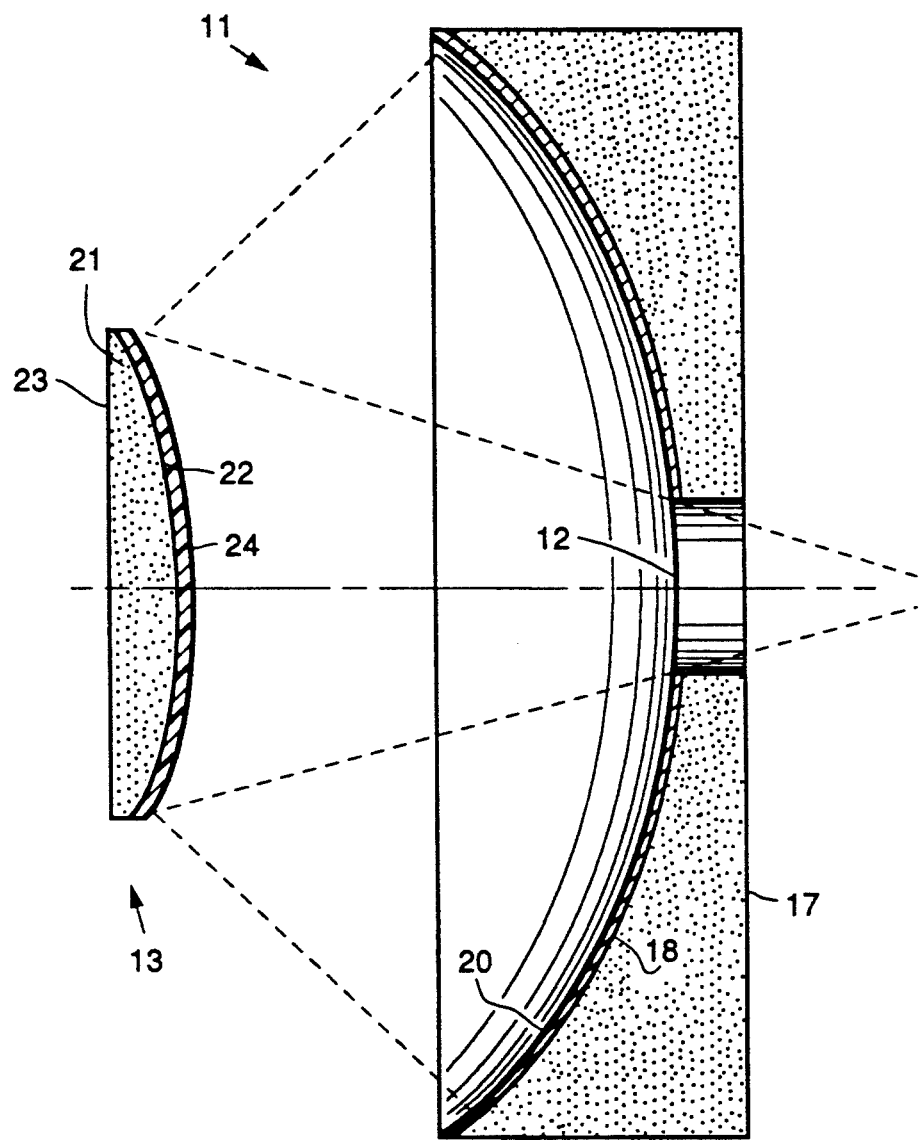
FIG. 1B is a fragmentary sectional view of part of the apparatus of FIG. 1A, on a somewhat enlarged scale.

Referring now to FIG. 1, a basic embodiment of an RF transparent, IR optical detector apparatus according to the present invention is shown. Although the example embodiment of the dual-mode detector apparatus shown in FIG. 1 is intended for use in the radio frequency (RF) and infrared (IR) portions of the electromagnetic spectrum, it is to be understood that the invention has applications in the ultraviolet through visible regions of the spectrum as well. Herein, that portion of the electromagnetic spectrum extending from UV through IR wavelengths is referred to as the "optical" wavelength region.

In the RF transparent IR optical apparatus 10 according to the present invention and shown in FIG. 1, all of the IR optical elements are nominally circularly symmetric about the longitudinal center line comprising the optical axis of the primary mirror 11. Thus, an adequate understanding of the structure and function of the apparatus 10 may be obtained by referring chiefly to FIG. 1.

As shown in FIG. 1, RF-transparent IR apparatus 10 includes a Cassegrain IR optical system including a concave primary mirror 11 having a central perforation 12, and a convex secondary mirror 13 for focusing optical energy collected by the primary mirror back through the perforation onto an infrared detector 14 located behind the aperture. Infrared detector 14 may be of any suitable type, such as a multi-element array of mercury-cadium-telluride (HgCdTe) elements operated in the photo-voltaic (PV) mode. If desired, an infrared transmissive correction lens 15 made of a material such as zinc selenide (ZnSe) may be located in front of detector 14. As shown in FIG. 1, apparatus 10 also includes a protective dome 16 made of a material such as zinc sulfide which is transparent to both infrared and radio frequency energy.

In apparatus 10 shown in FIG. 1, both primary mirror 11 and secondary mirror 13 are so constructed as to be highly reflective to infrared energy and highly transmissive to radio frequency energy, as will now be described.

As shown in FIG. 1, primary mirror 11 includes a circularly symmetric body 17 having a concave front surface 18 and flat rear surface 19. Body 17 should be made of a material that is very rigid, to provide the required stability of the optical contour of front surface 18 of body 17. Also, the material of which body 17 is made must be highly transparent to radio frequency energy. Additionally, it would be highly desirable that body 17 be made of a material which is lighter in weight than solid glass, for applications in which the apparatus is used in airborne vehicles.

Figure 2:
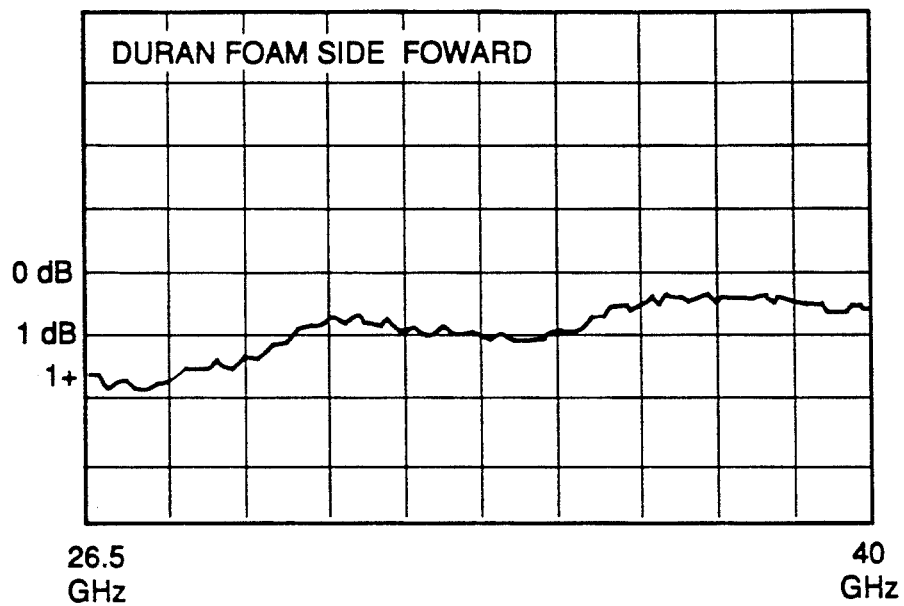
FIG. 2 is a graph of RF transmittance versus frequency for a foamed glass material used in the apparatus of FIG. 1.

The present inventor has found that a material which has all of the aforementioned desirable characteristics is foamed glass, such as type 8330 DURAN, manufactured by Schott Glass, Mainz, Germany. The above listed foam glass is available in a range of densities. One such foam glass that has sufficient stability for the present purposes has a density of approximately 1.12 grams per cubic centimeter. A sample of that material having the shape of a disk 12.4 cm in diameter and a thickness of 10.25 mm was tested for transmissivity at millimeter-wavelength radio frequencies. The results of that test are shown in FIG. 2.

Figure 4A:
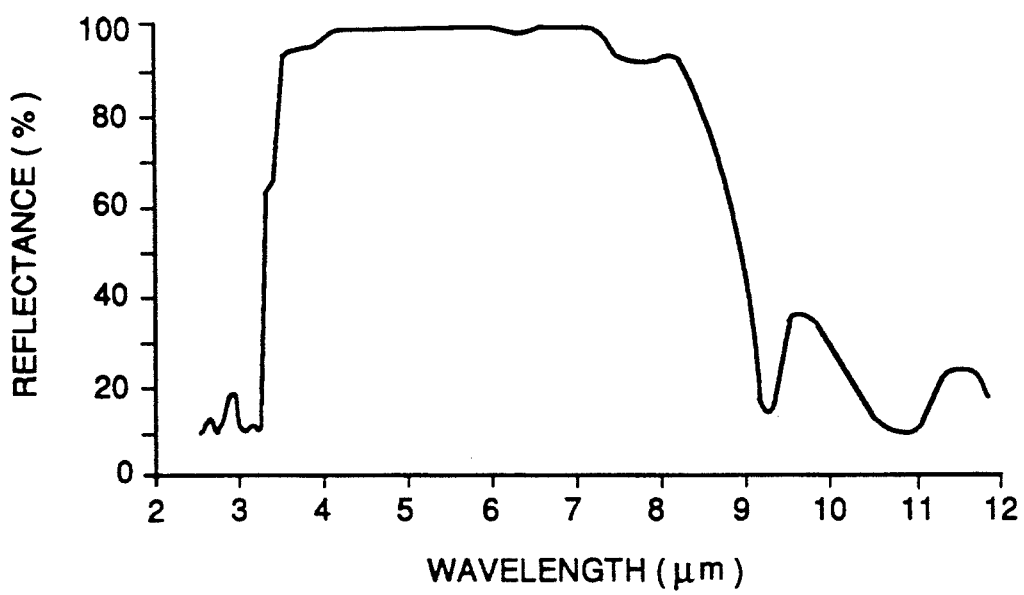
FIGS. 4A and 4B are graphs of IR reflectance versus wavelength for a multi-layer yet dielectric reflective coating used on elements of the apparatus shown in FIG. 1.
Figure 4B:
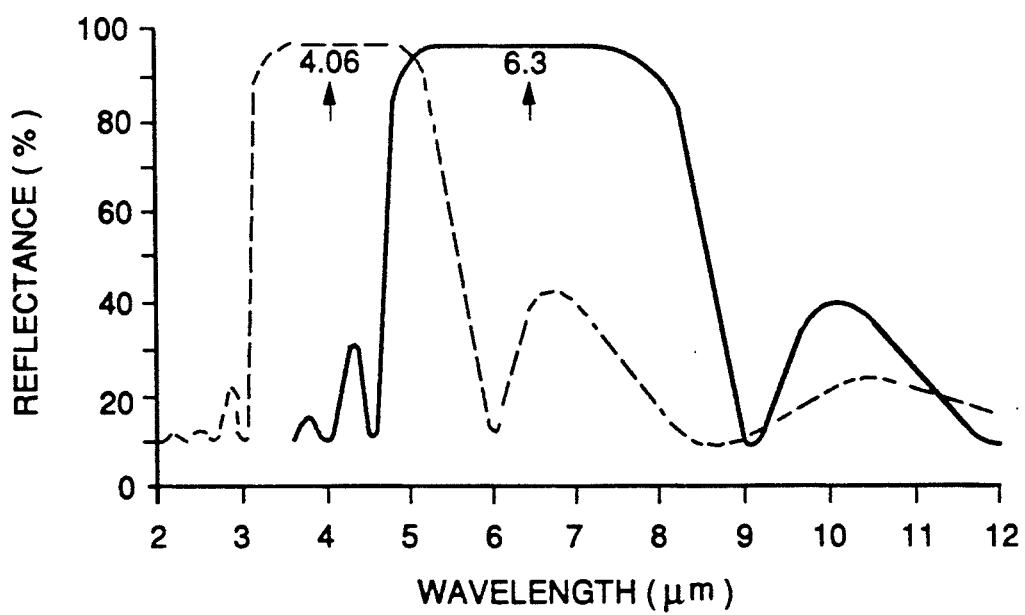

Concave front surface 18 of primary mirror body 17 is made highly reflective to a selected wavelength region of infrared energy by the application of a coating 20 made of multiple layers of a dielectric material such as stibnite or chiolite to the surface. The dielectric constant and thickness of the coatings is so chosen as to result in constructive interference for reflected electromagnetic waves in a particular region of the electromagnetic spectrum. FIG. 4 shows the spectral reflectivity of a particular multi-layer dielectric coating 20 made of layers of stibnite and chiolite on a barium fluoride substrate. As shown in FIG. 4, coating 20 is highly reflective in the wavelength range of 3.5 to 8.5 micrometers.

Since the dielectric materials used in coating 20 are very thin and have a reasonably low dielectric constant and loss tangent, radio frequency energy may be transmitted through reflective coating 20 with little direction deviation and low attenuation.

As shown in FIG. 1, secondary mirror 13 includes a circularly symmetric body 21 having a convex rear surface 22 and a flat front surface 23. Body 21 of secondary mirror 13 is made of an RF-transparent material such as the foamed DURAN used to fabricate primary mirror 11 and described above. Convex rear surface 22 of secondary mirror 13 is covered with a multi-layer dielectric coating 24 that is highly reflective in a selected band of infrared wavelengths. In one embodiment of the apparatus 10, coating 24 is so constructed as to have a spectral reflectance curve similar to that of primary mirror reflective coating 20. With that arrangement, the spectral transfer function for infrared energy impinging upon primary mirror coating 20 reflected forward to secondary mirror coating 24, and reflected back through perforation 12 of the primary mirror onto detector 14 is given by the product or convolution of the spectral reflectivity curves of the two coatings.

Figure 5:
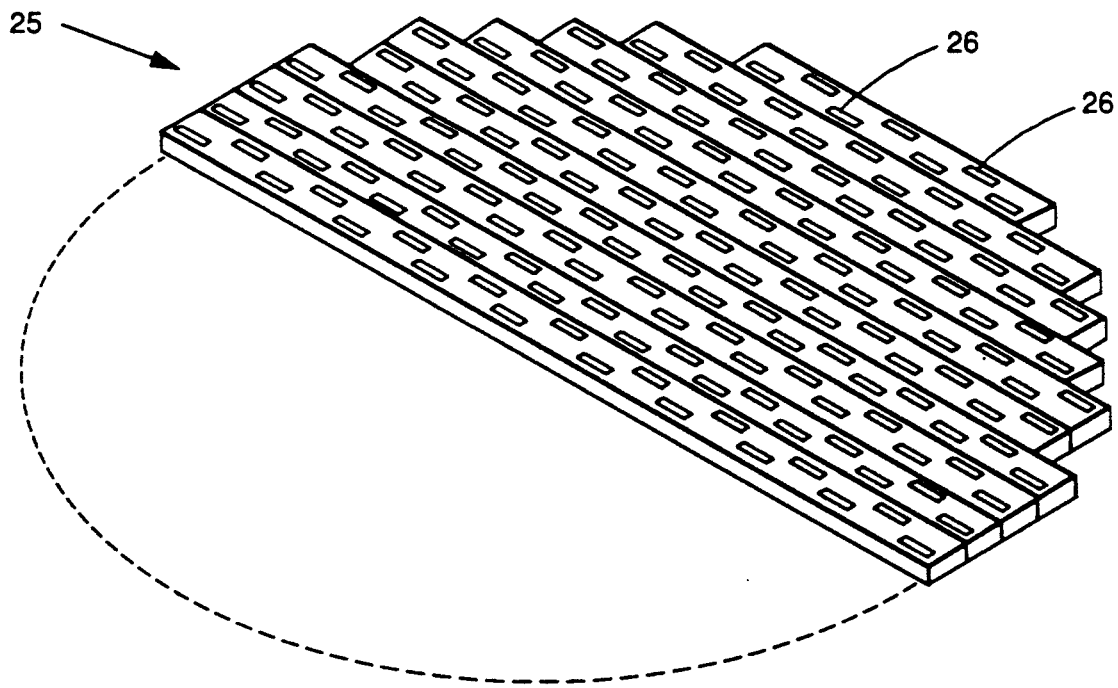
FIG. 5 is a fragmentary perspective view of an RF antenna comprising part of the apparatus of FIG. 1.

RF-transparent IR optical system 10 includes a radio frequency antenna 25 located behind primary mirror 11, as shown in FIG. 1. In the preferred embodiment, RF antenna 25 is a circular plan-view, planar device, such as a slotted waveguide array. FIG. 5 shows one quadrant of a typical vertical slotted array useable for antenna 25, in which RF energy radiated from a plurality of slots combines to form a desired transmitted beam pattern. Antenna 25 is also used to collect RF energy that has been previously transmitted from the antenna and reflected back towards the antenna from a target. Also, antenna 25 may be used to collect RF energy emitted by a target.

Because of the construction of primary mirror 11 and secondary mirror 13, RF antenna 25 may have the same aperture as primary mirror 11 for the transmission and reception of RF energy. As shown in FIG. 1 RF energy rays B may travel unimpeded through primary mirror 11, secondary mirror 13 and protective dome 16. Thus, the apparatus shown in FIG. 1 allows the full aperture of an infrared optical system to be utilized as an RF antenna aperture. Now an RF antenna beam width and sidelobe amplitude are both inversely proportional to the aperture of the antenna. Hence, the larger size of the RF antenna aperture made possible by the apparatus of FIG. 1, as compared to the aperture size of prior art systems, is highly advantageous. Also, flat plate antenna arrays can give better sidelobe performance than achievable with just a parabolic primary mirror.

In addition to the advantage of utilizing the full optical aperture for RF transmission and reception, it is important to note the apparatus of the present invention does not require the use of a particular antenna type or feed mechanism as do prior art RF/IR systems. Thus, the slotted array antenna 26 of FIG. 5 may be replaced by other types of RF antennas. For example, a phased array antenna having electronic steering and beam shape control may be used for antenna 25. Alternatively, an image array antenna may be used to further reduce sidelobes.

In the embodiment of RF-transparent IR optical system 10 described above, primary mirror 11 and secondary mirror 13 are fabricated as RF-transparent elements by forming reflective surfaces on the face plates of low-loss foam glass bodies by depositing thereon multiple dielectric layers that function as interference filters. In an alternate embodiment of apparatus 10, the foam glass bodies of mirrors 11 and 13 are replaced by the "egg-crate" structure shown in FIGS. 3A–3C.

Figure 3A:
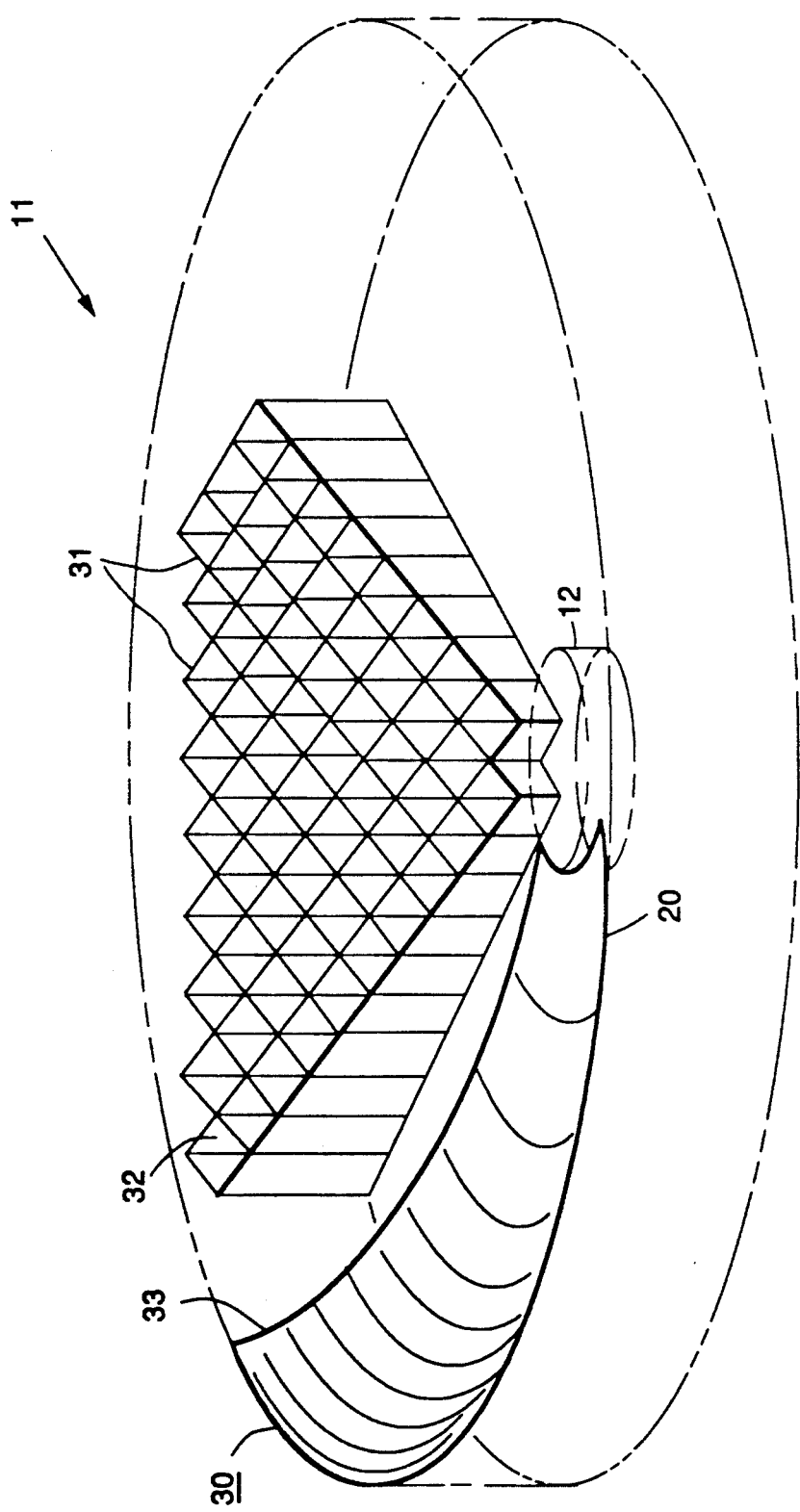
FIG. 3A is a perspective partly fragmentary view of an "egg-crate" support structure face plate for optical elements in an alternate embodiment of the apparatus of FIG. 1.
Figure 3B:
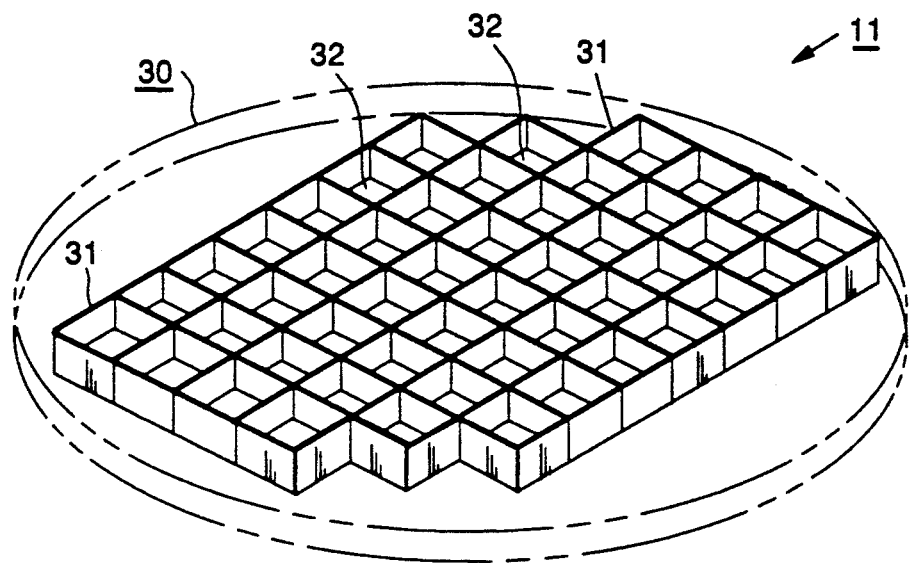
FIG. 3B is a front perspective view of the support structure of FIG. 3A
Figure 3C:
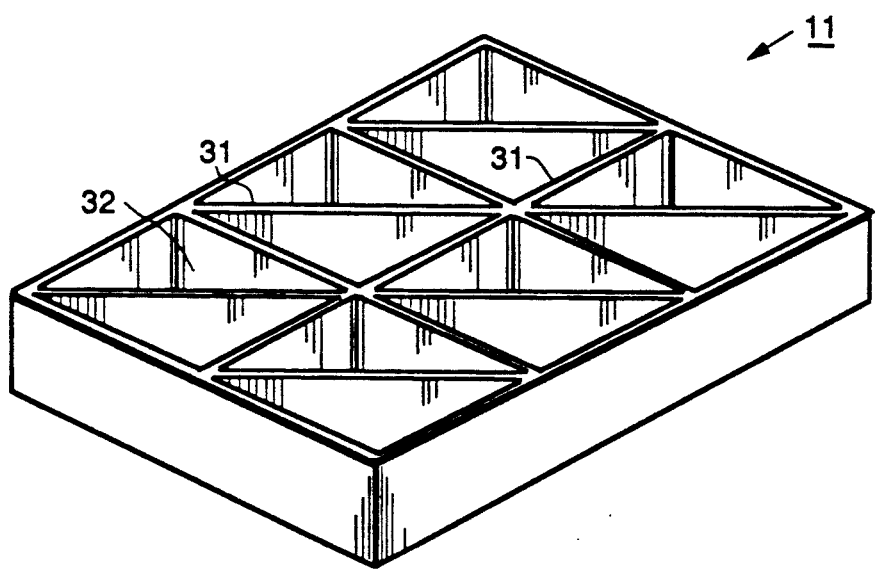
FIG. 3C is a fragmentary view of the support structure of FIG. 3A, on an enlarged scale.

As shown in FIGS. 3A–3C, an optical element such as primary mirror 11 or secondary mirror 13 may be fabricated from a rigid body 30 formed from a plurality of thin sheets or slats 31 of fused silica that are disposed perpendicularly to a common base plane to form a grid of empty cells 32 each having the shape of a polygonal prism. Slats 31 are fused to one another and to a curved face plate 33, as shown in FIG. 3A, to form a rigid body. Most RF energy traveling parallel to the longitudinal axis of body 30 propagates through empty cells 32, thus resulting in a structure having a very low loss at radio frequencies.

An essential characteristic of the dual mode RF/IR optical apparatus according to the present invention is the RF-transparency of IR optical elements used in the apparatus. Another possible technique for forming an IR-reflective, RF-transparent surface on optical elements such as primary mirror 11 and secondary mirror 13 consists of forming a very thin metallic coating on a surface. Calculations reveal that if the penetration depth of radio frequency waves is greater than the thickness of the metallic layer by a ratio of about 10 to 1, RF energy is transmitted through the layer with very little attenuation. One candidate metallic coating that may yield both adequate IR reflectivity in the wavelength range of 3–12 microns, and RF transmissivity in a frequency band near 94 Ghz is a tantalum film having a thickness of about 50 microns. The tantalum film may be applied to the surface of the optical elements by any convenient means such as sputtering or vacuum evaporation.

Thin, RF-transparent, IR-reflective metallic films of the type described above could be used to form the reflective surfaces on both primary mirror 11 and secondary mirror 13. Using metallic coatings affords a substantial manufacturing cost savings over multi-layer dielectric films. By using a metallic film as the reflective coating on the primary mirror 11, and a dielectric reflective coating on the much smaller secondary mirror 13, substantial cost savings can be achieved, along with a desired spectral selectivity afforded by the dielectric reflective coating.

The utilization of two wave-length selective infrared reflective surfaces in the apparatus 10 as shown in FIG. 1, affords the possibility of solving certain infrared tracking problems, as will now be described.

It is well known that the exhaust plume of a jet engine produces substantial infrared emissions in the 2–5 micron range. Also, it is well known that a warm nose cone typically emits substantial blackbody radiation in the 8–10 micron portion of the infrared spectrum. Thus, if the apparatus of FIG. 1 were used to track the two aforementioned types of targets, it may be desirable to separate the two bands and eliminate or at least reduce infrared radiation outside of the two wavelength bands of interest from impinging on the detectors. Reduction of out-of-band radiation decreases photon noise, thereby improving signal-to-noise ratio and overall performance of the infrared detection system. Separation of detected energy into two wavelength bands enhances target and countermeasure discrimination.

Figure 6:
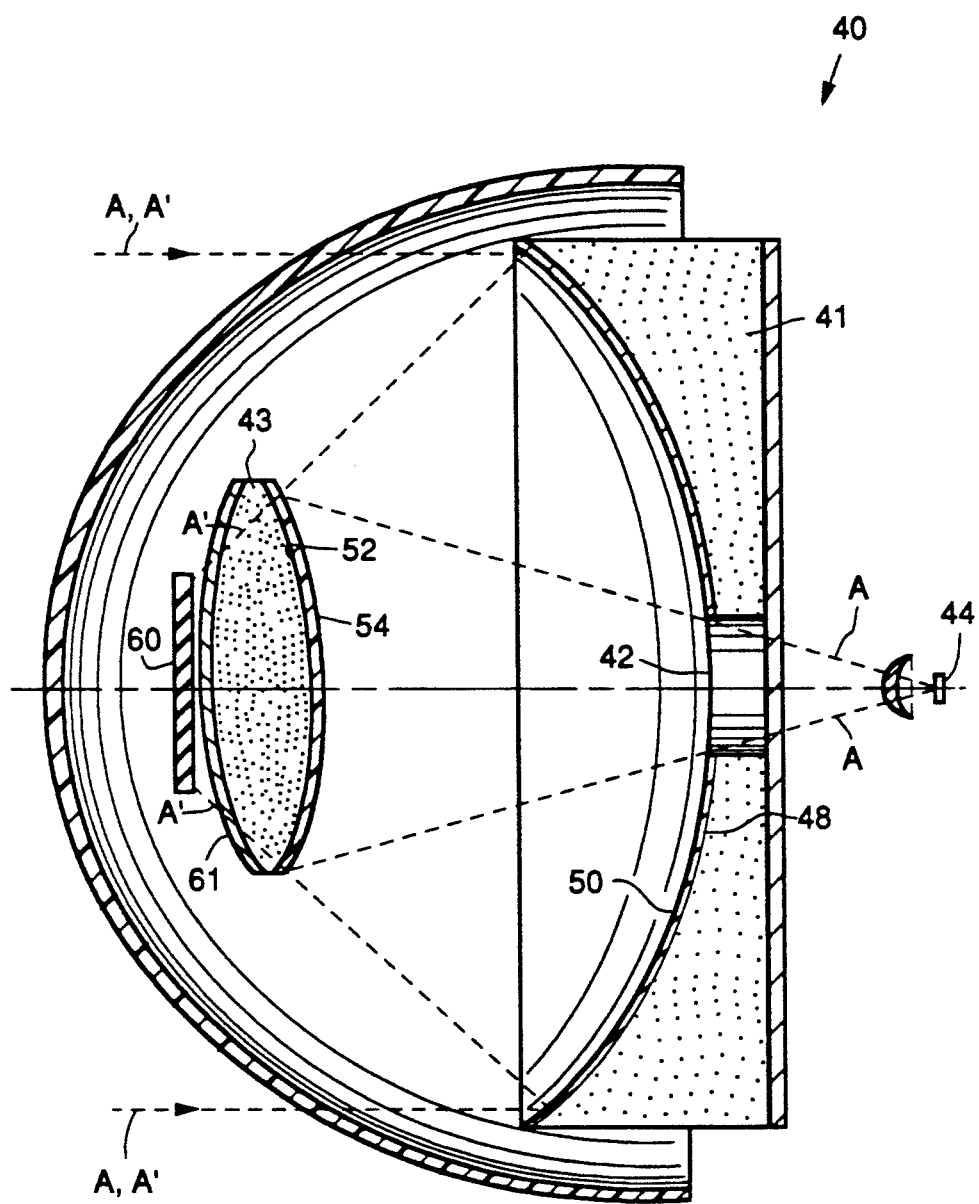
FIG. 6 is a longitudinal sectional view of a variation of the apparatus of FIG. 1, which is useable at two discrete IR wavelength ranges in addition to an RF wavelength band.
Figure 7:
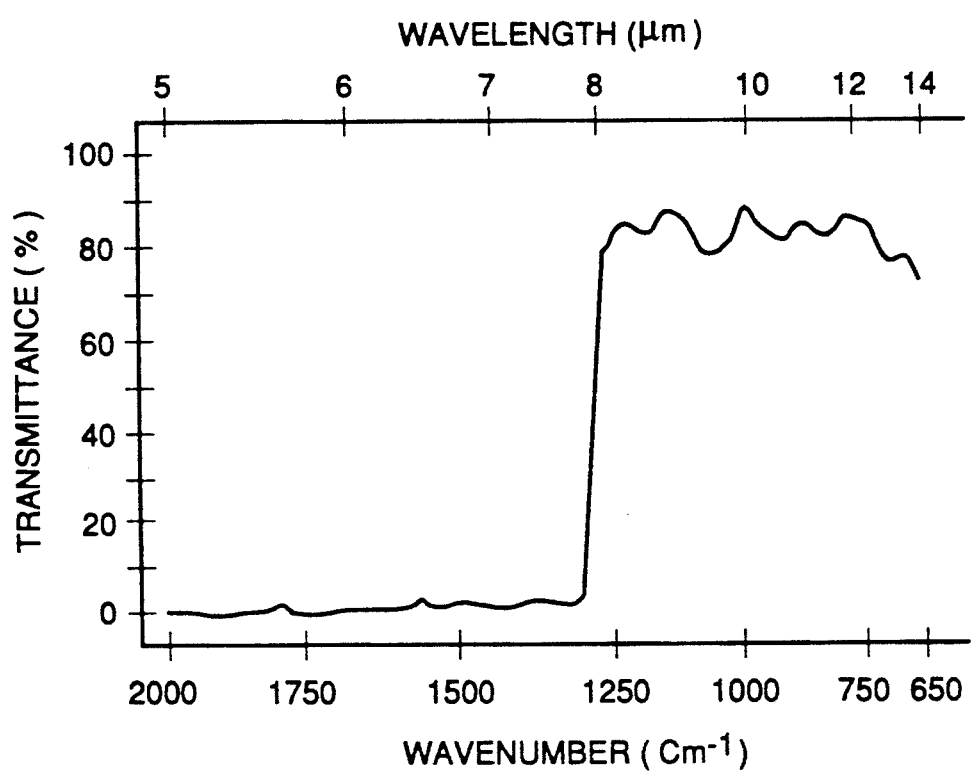
FIG. 7 is a graph of IR reflectance versus wavelength for a dual dielectric coating used in the alternate embodiment of the invention shown in FIG. 6.

FIG. 6 illustrates a modification 40 of the apparatus 10 shown in FIG. 1 which may be made responsive to two different infrared wavelength bands. As shown in FIG. 6, primary mirror 41 of apparatus 40 has on the concave front faceplate surface 48 thereof a reflective coating 50. Reflective coating 50 may be an RF-transparent, thin metallic coating that is substantially reflective in an infrared wavelength band or bands of interest. Alternatively, coating 50 may be a dual wavelength band multi-layer dielectric interference filter having a reflectance curve of the type shown in FIG. 7.

As shown in FIG. 6, modified apparatus 40 includes a first infrared detector 44 located behind a central coaxial perforation 42 through primary mirror 41. In addition, apparatus 40 includes a second infrared detector 60 behind a coating 54 on the convex rear surface 52 of secondary mirror 43. Coating 54 is preferably a multi-layer dielectric interference filter which is substantially reflective to a first wavelength band, for example, 8 to 10 microns, which first detector 44 is adapted to be responsive to. Coating 54 is also substantially transparent to a second wavelength band, for example, 5 to 8 microns, which second infrared detector 60 is adapted to be responsive to. Thus, IR rays A in a first wavelength band incident upon primary mirror 41 are reflected off coating 50 on front surface 48 forward to coating 54 on a rear surface 52 of secondary mirror 43, and rearward off of the latter surface to first infrared detector 44. Infrared energy in a second wavelength band which impinges upon coating 54 on secondary mirror 43 is transmitted through the coating to second infrared detector 60. As shown in FIG. 6, secondary mirror preferably has a convex front surface 61 to bring into focus on second infrared detector 60 infrared energy in the second wavelength band transmitted through coating 54. Thus, the apparatus 40 depicted in FIG. 7 may track targets in two discrete infrared wavelength bands, as well as in radio frequency bands. This arrangement also decreases cost by utilizing separate single wavelength region detectors, rather than "sandwiched", multi-band detectors. Low manufacturing yields make sandwiched detectors quite expensive.

What is claimed is:

1. An apparatus for collecting and detecting radiant energy in optical and radio frequency regions of the electromagnetic spectrum comprising:
   a. an optical telescope having an entrance aperture for collecting and focusing energy in an optical band of said electromagnetic spectrum onto a detector, said telescope being comprised of RF-transmissive elements including a primary mirror, at least one of said RF-transmissive elements having thereon on a conductive metal coating which is reflective to optical wavelengths and transmissive to radio frequency energy, and
   b. a radio frequency antenna located rearward of said primary mirror, said radio frequency antenna being so constructed as to permit transmission and reception of radio frequency energy through all of said entrance aperture of said optical telescope.

2. The apparatus of claim 1 wherein at least one of said RF-transmissive elements is further defined as being preferentially transmissive to optical energy in a first, selected wavelength band, and less transmissive to energy in a second, non-selected wavelength band.

3. The apparatus of claim 2 wherein said preferentially transmissive element is further defined as being an optical interference filter.

4. The apparatus of claim 3 wherein said optical interference filter is further defined as comprising at least one layer of dielectric film.

5. The apparatus of claim 1 wherein at least one of said RF-transmissive elements is further defined as being preferentially reflective to optical energy in a first, selected wavelength band, and less reflective to energy in a second, non-selected wavelength band.

6. The apparatus of claim 5 wherein said preferentially reflective element is further defined as being an optical interference filter.

7. The apparatus of claim 6 wherein said interference filter is further defined as comprising at least one layer of dielectric film.

8. The apparatus of claim 6 wherein said preferentially reflective element comprises an optical element on which a surface thereof has applied thereto to optically reflective RF-transparent conductive coating.

9. The apparatus of claim 8 wherein said conductive coating of said preferentially reflective element is further defined as having a thickness less than about one-tenth of the penetration depth for radio frequency waves of the minimum wavelength for which said apparatus is intended to be used to detect.

10. The apparatus of claim 9 wherein said conductive coating of said preferentially reflective element is further defined as a metallic coating.

11. The apparatus of claim 10 wherein said metallic coating is further defined as a thin layer of tantalum.

12. A dual-mode, optical and radio frequency detector apparatus comprising:
  a. a primary mirror, said primary mirror comprising an RF-transmissive body having on a front surface thereof an optically reflective, RF-transmissive coating adapted to reflect optical energy forward,
  b. a secondary mirror located in front of said primary mirror, said secondary mirror comprising an RF-transmissive body having on a rear surface thereof an optically reflective, RF-transmissive coating, said secondary mirror being adapted to reflect optical energy rearward, at least one of said optical reflective, RF-transmissive coatings comprising a conductive metal film,
  c. an optical detector rearward of said secondary mirror, said detector being adapted to receive optical energy reflected rearward from said secondary mirror, and
  d. a radio frequency antenna located rearward of said primary mirror, said antenna being adapted to receive radio frequency energy distributed over the entire aperture area of said primary mirror.

13. The apparatus of claim 12 wherein said body of at least one of said primary and secondary mirrors is further defined as being made of a void-containing material.

14. The apparatus of claim 13 wherein said void-containing material is further defined as foamed silicate glass.

15. The apparatus of claim 13 wherein said void-containing material is further defined as comprising a lattice of silicate glass plates fused to one another and to a face plate.

16. The apparatus of claim 12 wherein said optically reflective coating on said front surface of said primary mirror is further defined as being a first interference filter.

17. The apparatus of claim 16 wherein said first interference filter is further defined as being composed of at least one thin dielectric film.

18. The apparatus of claim 16 wherein said optically reflective coating on said rear surface of said secondary mirror is further defined as being a second interference filter.

19. The apparatus of claim 18 wherein said second interference filter is further defined as being composed of at least one thin dielectric film.

20. The apparatus of claim 12 wherein said optically reflective coating on said front surface of said primary mirror is further defined as being a thin, optically reflective, RF-transmissible coating made of a conductive film material having a thickness of less than about one-tenth the penetration depth, for that material, of radio frequency waves of the minimum wavelength for which said apparatus is intended to be used to detect.

21. The apparatus of claim 20 wherein said optically reflective coating on said rear surface of said secondary mirror is further defined as being an interference filter.

22. The apparatus of claim 20 wherein said optically reflective coating on said rear surface of said secondary mirror is further defined as being a thin, optically reflective, RF-transmissive coating made of a conductive material having a thickness of less than about one-tenth the penetration depth, for the material, of radio frequency waves of the minimum wavelength for which said apparatus is intended to detect.

23. A dual-mode, optical and radio frequency detector apparatus comprising:
  a. a primary mirror including a body having a concave front face on which is formed an optically reflective, RF-transmissive surface,
  b. a secondary mirror comprising a body having a convex rear surface on which is formed an optically reflective, RF-transmissive layer, said layer being reflective to optical energy in a first wavelength band and transmissive to optical energy in a second wavelength band of the optical spectrum,
  c. a first optical detector rearward of said secondary mirror, said first detector being adapted to receive optical energy in said first wavelength band reflected from said secondary mirror,
  d. a second optical detector located forward of said secondary mirror, said second optical detector being adapted to receive optical energy in said second wavelength band of said optical spectrum transmitted through said secondary mirror, and
  e. a radio frequency antenna located rearward of said primary mirror, said antenna being adapted to receive radio frequency energy distributed over the entire aperture area of said primary mirror.

24. The apparatus of claim 23 wherein the body of at least one mirror thereof is formed from foamed glass.

25. The apparatus of claim 23 wherein the body of at least one mirror thereof is further defined as comprising a lattice work of glass plates fused to one another and to a curved face plate, thereby forming an egg-crate-like structure.

26. The apparatus of claim 23 wherein said optically reflective surface on said secondary mirror is further defined as comprising at least one layer of dielectric film.

27. The apparatus of claim 23 wherein said optically reflective surface on said primary mirror is further defined as being an RF-transparent conductive coating.

28. The apparatus of claim 23 wherein said primary mirror is further defined as having through the thickness dimension thereof a central coaxial perforation.

29. The apparatus of claim 28 wherein said first optical detector is located behind said perforation.

30. The apparatus of claim 23 wherein said RF antenna is further defined as being a planar array.

31. The apparatus of claim 30 wherein said planar array is further defined as being a slotted array.

32. The apparatus of claim 30 wherein said planar array is further defined as being a phased array.

33. The apparatus of claim 30 wherein said planar array is further defined as being an imaging array.

* * * * *